(12) United States Patent
Matsubuchi et al.

(10) Patent No.: US 10,883,536 B2
(45) Date of Patent: Jan. 5, 2021

(54) TAPERED ROLLER BEARING

(71) Applicant: NTN CORPORATION, Osaka (JP)

(72) Inventors: Hiroki Matsubuchi, Shizuoka (JP); Takashi Kawai, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/498,554

(22) PCT Filed: Mar. 29, 2018

(86) PCT No.: PCT/JP2018/013337
§ 371 (c)(1),
(2) Date: Sep. 27, 2019

(87) PCT Pub. No.: WO2018/181756
PCT Pub. Date: Oct. 4, 2018

(65) Prior Publication Data
US 2020/0063792 A1  Feb. 27, 2020

(30) Foreign Application Priority Data
Mar. 30, 2017  (JP) ................ 2017-067631

(51) Int. Cl.
*F16C 33/36*  (2006.01)
*F16C 33/46*  (2006.01)
(Continued)

(52) U.S. Cl.
CPC .......... *F16C 19/364* (2013.01); *F16C 33/467* (2013.01); *F16C 33/6681* (2013.01)

(58) Field of Classification Search
CPC ............. F16C 19/364; F16C 33/4623; F16C 33/4629; F16C 33/4635; F16C 33/6651; F16C 33/6681
See application file for complete search history.

(56) References Cited

U.S. PATENT DOCUMENTS 4,425,011 A * 1/1984 Cunningham ...... F16C 33/4635
  384/571
9,140,303 B2 * 9/2015 Dittmar .............. F16C 33/4635
(Continued)

FOREIGN PATENT DOCUMENTS

JP  2003-287033  10/2003
JP  2004084799 A * 3/2004 ............ F16C 19/364
(Continued)

OTHER PUBLICATIONS

"Inclined" Merriam-Webster.com/dictionary (Year: 2020).*
(Continued)

*Primary Examiner* — Phillip A Johnson
(74) *Attorney, Agent, or Firm* — Wenderoth, Lind & Ponack, L.L.P.

(57) ABSTRACT

A tapered roller bearing includes a cage supporting a plurality of tapered rollers. The cage includes a large-diameter annular portion; a small-diameter annular portion; pillars through which the large-diameter annular portion and the small-diameter annular portion are coupled together; and pockets in which the respective tapered rollers are disposed. A space is defined between the outer ring and the inner ring, and constitutes an oil flow path through which lubricating oil (a) flows from the side of the small flange to the side of the large flange. Each pillar includes, in its radially inner surface, an oil groove in which lubricating oil is retained. When the cage rotates, the lubricating oil retained in the oil grooves of the pillars is scattered out of the oil grooves, thereby preventing seizure between the large-diameter end surfaces of the tapered rollers and the large flange of the inner ring.

21 Claims, 8 Drawing Sheets

(51) Int. Cl.
  *F16C 33/66* (2006.01)
  *F16C 19/36* (2006.01)

(56) References Cited

U.S. PATENT DOCUMENTS

| | | | |
|---|---|---|---|
| 10,221,891 B2 * | 3/2019 | Kamamoto | ........... F16C 33/664 |
| 2001/0003548 A1 | 6/2001 | Straub et al. | |
| 2015/0275974 A1 | 10/2015 | Suzuki | |

FOREIGN PATENT DOCUMENTS

| | | | | |
|---|---|---|---|---|
| JP | 2007-321848 | | 12/2007 | |
| JP | 2008-045711 | | 2/2008 | |
| JP | 2012-241873 | | 12/2012 | |
| JP | 2012241873 A | * | 12/2012 | .......... F16C 33/6681 |
| JP | 2014-202341 | | 10/2014 | |
| JP | 2015-183804 | | 10/2015 | |

OTHER PUBLICATIONS

"Oblique" Merriam-Webster.com/dictionary (Year: 2020).*
International Search Report dated Jun. 19, 2018 in corresponding International (PCT) Patent Application No. PCT/JP2018/013337.
International Preliminary Report on Patentability dated Oct. 1, 2019 in corresponding International (PCT) Patent Application No. PCT/JP2018/013337.

* cited by examiner

TAPERED ROLLER BEARING

TECHNICAL FIELD

The present invention relates to a tapered roller bearing.

BACKGROUND ART

Tapered roller bearings include an outer ring; an inner ring disposed inwardly of the outer ring; a cage disposed between the outer ring and the inner ring, and having a plurality of pockets; and a plurality of tapered rollers disposed in the respective pockets. The cage includes pillars between its large-diameter annular portion and small-diameter annular portion. The pockets of the cage are defined by the large-diameter annular portion, the small-diameter annular portion, and the pillars. Generally, a space is defined between the outer ring and the inner ring, and constitutes an oil flow path through which lubricating oil flows from the side of the small flange of the inner ring to the side of the large flange of the inner ring (see paragraphs 0018 to 0034 and FIGS. 1 and 2 of Japanese Unexamined Patent Application Publication No. 2008-45711 (hereinafter, JP '711), and paragraphs 0012 to 0028 and FIGS. 1 to 6 of Japanese Unexamined Patent Application Publication No. 2012-241873 (hereinafter, JP '873).

Since the tapered rollers are normally held by the pillars of the cage in the tapered roller bearings of JP '711 and JP '873, the contact areas between the tapered rollers and the pillars are large. This increases the shearing torque of lubricating oil between the tapered rollers and the pillars, thereby causing the rotation torque of the bearing to increase.

Also, since the cage is present between the adjacent pair of tapered rollers such that no gap is defined between each tapered roller and the cage, no smooth cooling effect due to lubricating oil can be expected between the cage and the tapered rollers, so that the temperature of the interior of the bearing may rise excessively.

Therefore, in many conventional bearings, in order to prevent seizure between the sliding contact portions of the large-diameter-side inner end surface of the inner ring's large flange, and the large-diameter end surfaces of the tapered rollers, lubricating oil is positively fed through the oil flow path from the side of the small flange of the inner ring to the side of the large flange thereof.

In today's automotive power transmission devices, such as differentials or transmissions, lubricating oil having a low viscosity or a small amount of lubricating oil tends to be used to reduce fuel consumption, so that sufficient lubricating oil films may not be formed in tapered rollers bearings used therein. Therefore, seizure resistance and low torque are required for tapered roller bearings used in an automotive power transmission device, such as a differential or a transmission, In order to positively feed lubricating oil from the side of the small flange of the inner ring to the side of the large flange thereof, JP '711 proposes to form oil guiding slits on the pocket-defining inner side surfaces of the pillars of the cage to extend from the small-diameter annular portion and open to the large-diameter annular portion.

However, in JP '711, since the cage is disposed such that no gap is defined between each tapered roller and the cage, a sufficient cooling effect due to lubricating oil cannot be expected, so that the temperature of the interior of the bearing may rise excessively, thereby causing seizure between the large-diameter end surfaces of the tapered rollers and the large flange of the inner ring.

In view of the above background, it is an object of the present invention to provide a tapered roller bearing having suitably improved seizure resistance between the large-diameter end surfaces of the tapered rollers and the large flange of the inner ring.

SUMMARY OF THE INVENTION

In order to achieve the above object, the present invention provides a tapered roller bearing comprising: an outer ring; an inner ring disposed inwardly of the outer ring; a cage between the outer ring and the inner ring; and a plurality of tapered rollers retained by the cage, wherein the inner ring includes: a raceway surface on which the tapered rollers are rollable; a small flange on a small-diameter side of the raceway surface; and a large flange on a large-diameter side of the raceway surface, wherein the cage includes: a large-diameter annular portion; a small-diameter annular portion; pillars which axially extend, and through which the large-diameter annular portion and the small-diameter annular portion are coupled together; and pockets in which the respective tapered rollers are disposed, wherein a space is defined between the outer ring and the inner ring, and constitutes an oil flow path through which lubricating oil can flow from a side of the small flange to a side of the large flange, and wherein each of the pillars has, in a radially inner surface of the pillar, an oil groove through which the lubricating oil can flow, the oil groove comprising: a straight oil groove portion extending along the pillar; and an inclined oil groove portion extending obliquely from a large-diameter-side end of the straight oil groove portion close to the large-diameter annular portion in one of two opposite circumferential directions.

With this arrangement, when the bearing rotates, lubricating oil in the bearing flows through the oil grooves into spaces between the large-diameter end surfaces of the tapered rollers and the large flange of the inner ring, thereby preventing seizure between the large-diameter end surfaces of the tapered rollers and the large flange of the inner ring. Also, since each oil groove includes an inclined oil groove portion extending obliquely from the large-diameter-side end of the straight oil groove portion, which is close to the large-diameter annular portion, in one of the two opposite circumferential directions, it is possible to easily supply lubricating oil to the large-diameter end surfaces of the tapered rollers. Also, when the bearing stops, lubricating oil is retained in the oil grooves. Therefore, when the cage rotates, lubricating oil is scattered out of the oil grooves, and adheres to the large-diameter end surfaces of the tapered rollers, thereby preventing seizure between the large-diameter end surfaces of the tapered rollers and the large flange of the inner ring. Thus, the oil grooves function to retain lubricating oil while the bearing is not rotating, and function to supply lubricating oil into the spaces between the large-diameter end surfaces of the tapered rollers and the large flange of the inner ring while the bearing is rotating, thereby preventing seizure therebetween.

In this arrangement, the oil flow path may be defined between an inner peripheral surface of the outer ring and a radially outer surface of the cage, and the cage may further include, in each of the pillars, slits that radially inwardly guide a flow of the lubricating oil, the slits communicating with the oil groove. With this arrangement, the slits also retain not a small amount of lubricating oil. Therefore, when the cage rotates, lubricating oil is sent through the slits into the oil grooves communicating with the slits and scattered out of the oil grooves, and is simultaneously partially scattered out of the slits, too. Scattered lubricating oil adheres both onto the outer peripheral surfaces of the tapered rollers, and between the large-diameter end surfaces of the tapered rollers and the large flange of the inner ring, thereby further improving the seizure resistance of the tapered roller bearing.

By forming such slits in the pillars, it is possible to reduce the contact areas of the pillars with the tapered rollers, and thus to reduce the rotation torque of the bearing.

In this arrangement, the slits of each of the pillars may communicate with the radially outer surface of the cage, and the oil groove. This enables lubricating oil on the radially outer surfaces of the pillars to be easily guided into the slits. This easily increases the amount of lubricating oil flowing into the oil grooves, thereby further improving the seizure resistance of the tapered roller bearing.

If the inclined oil groove portion of the oil groove of each of the pillars is a first inclined oil groove portion, and the oil groove further includes a second inclined oil groove portion branching off from the large-diameter-side end of the straight oil groove portion in the other of the two opposite circumferential directions, the first and second inclined oil groove portions being open to two circumferential side surfaces of the pillar, respectively, it is possible to scatter lubricating oil toward the sections of the large-diameter annular portion located on the two circumferential sides of each pillar, and thus to prevent seizure by lubricating oil irrespective of the rotation direction of the bearing. The bifurcated first and second inclined oil groove portions of each of the pillars are preferably symmetrically arranged with respect to the axial direction of the pillar, because, due to this, it is possible to uniformly scatter lubricating oil irrespective of the rotation direction of the bearing.

If the large-diameter annular portion has oil retaining grooves in a side surface of the large-diameter annular portion facing the pockets, it is possible to retain lubricating oil in the oil retaining grooves, and thus to supply a larger amount of lubricating oil into the portion of the bearing at which seizure is most likely to occur, specifically, into the spaces between the large-diameter end surfaces of the tapered rollers and the large flange of the inner ring.

It is preferable to make the gap between the small-diameter annular portion of the cage and the small flange of the inner ring opposed to each other as narrow as possible, by reducing the inner diameter of the small-diameter annular portion. This enables lubricating oil to be effectively supplied to the large flange of the inner ring.

A gap is preferably defined between a radially outer surface of the small flange of the inner ring and a radially inner surface of the small-diameter annular portion of the cage, the gap being 1.5% or less of an outer diameter dimension of the small flange.

EFFECTS OF THE INVENTION

The tapered roller bearing of the present invention has the above-described structure, and thus has suitably improved seizure resistance between the large-diameter end surfaces of the tapered rollers and the large flange of the inner ring.

DETAILED DESCRIPTION OF THE INVENTION

First Embodiment

Figure 1:
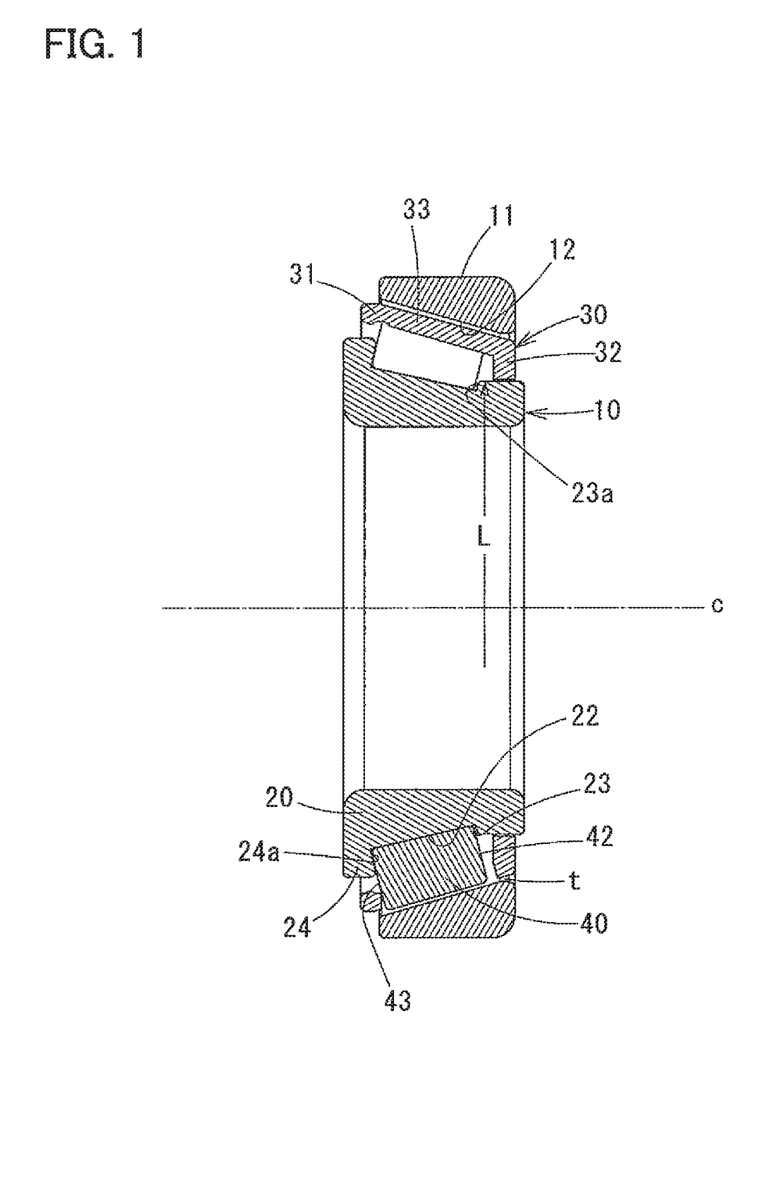
FIG. 1 is a vertical sectional view of a tapered roller bearing according to a first embodiment of the present invention.
Figure 2A:
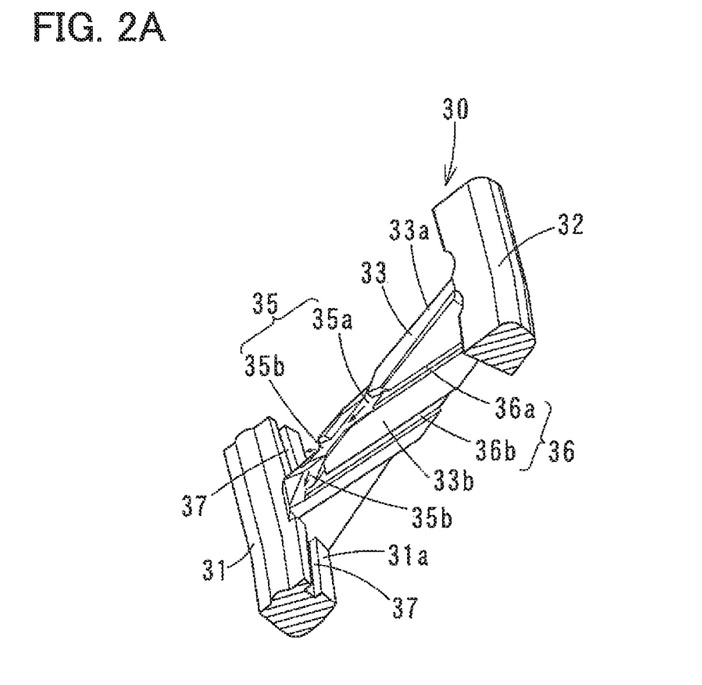
FIGS. 2A, 2B and 2C are, respectively, a fragmentary perspective view, a fragmentary front view, and a fragmentary plan view of a cage of the first embodiment.
Figure 2B:
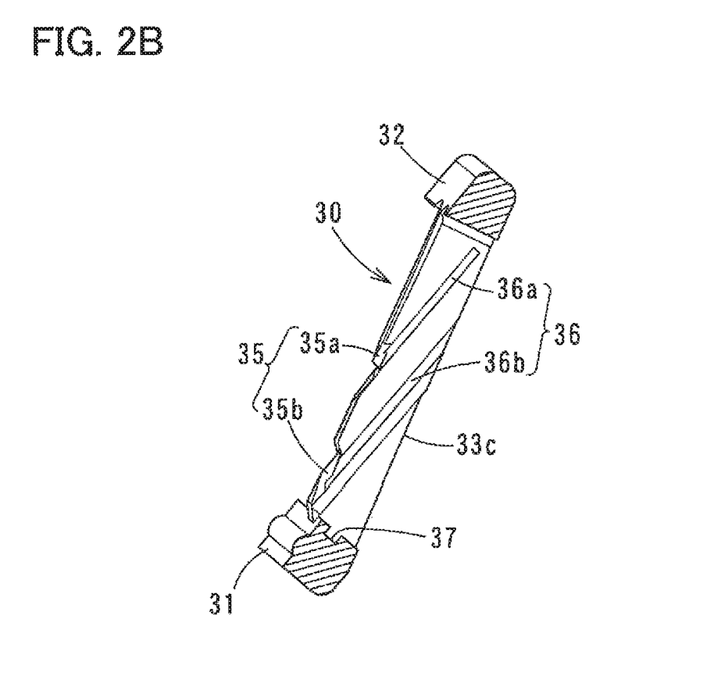
Figure 2C:
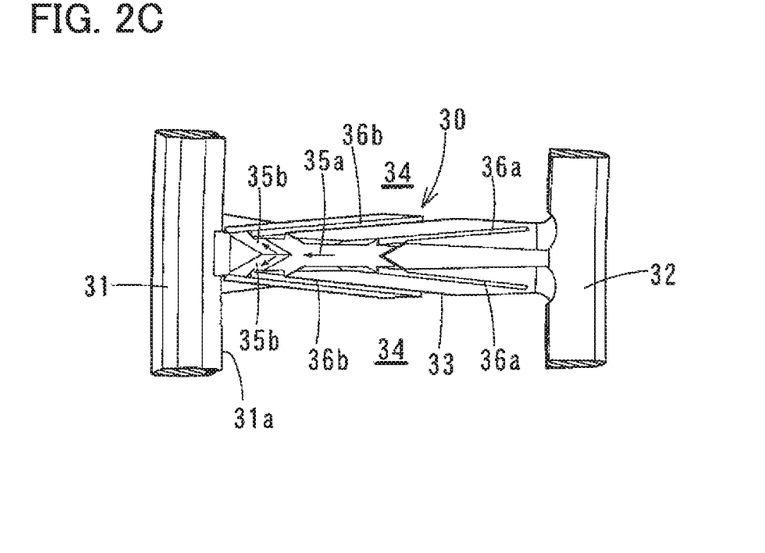

The tapered roller bearing according to the first embodiment of the present invention is illustrated in, and described now with reference to, FIGS. 1 to 2C. FIG. 1 is a vertical sectional view of the tapered roller bearing according to the first embodiment. FIGS. 2A, 2B and 2C are, respectively, a fragmentary perspective view, a fragmentary front view, and a fragmentary plan view of the tapered roller bearing.

As illustrated in FIG. 1, the tapered roller bearing 10 (which is hereinafter sometimes simply referred to as the "bearing 10") includes a ring-shaped outer ring 11; a ring-shaped inner ring 20 disposed radially inwardly of the outer ring 11; a ring-shaped cage 30 disposed between the outer ring 11 and the inner ring 20; and a plurality of tapered rollers 40 retained by the cage 30. The outer ring 11, the inner ring 20, and the tapered rollers 40 are all made of a metal material. As used herein, "axial", "axially", and "axial direction" refer to the direction parallel to the center axis c of the tapered roller bearing 10; "radial", "radially" and "radial direction" refer to a direction orthogonal to the center axis c; and "circumferential", "circumferentially" and "circumferential direction" refer to the direction along an imaginary circular arc having a center at the center axis c.

The cage 30 is made of a resin. While the resin for the cage 30 is not particularly limited, for example, the cage 30 may be integrally formed of a super engineering plastic, such as polyphenylene sulfide (PPS), polyether ether ketone (PEEK), polyamide (PA), polyphthalamide (PPA), or polyamide imide (PAI). By using such an engineering plastic, which shows excellent mechanical strength, oil resistance and heat resistance, compared with a cage made of an iron plate, the cage 30 is lightweight, and shows excellent self-lubricity and a low friction coefficient. Therefore, by the synergistic effect of such an engineering plastic forming the cage 30, and lubricating oil present in the bearing 10, it is possible to reduce the wear of the cage 30 due to its contact with the outer ring 11. Also, the above-mentioned resins, which are lighter in weight and lower in friction coefficient than an iron plate, are suitable for reducing torque loss when the bearing 10 is actuated, and for reducing the wear of the cage. However, the cage 30 may be made of a metal (such as iron) instead.

Engineering plastics include general-purpose engineering plastics, and super engineering plastics. Only some representative engineering plastics are exemplified below, and it should be understood that there are other engineering plastics.

General-purpose engineering plastics include, e.g., polycarbonate (PC), polyamide 6 (PA6), polyamide 66 (PA66), polyacetal (POM), denaturalized polyphenylene ether (m-PPE), polybutylene terephthalate (PBT), glass fiber reinforced polyethylene terephthalate (GF-PET), and ultra-high-molecular-weight polyethylene (UHMW-PE).

Super engineering plastics include, e.g., polysulfone (PSF), polyethersulfone (PES), polyphenylene sulfide (PPS), polyarylate (PAR), polyamideimide, polyetherimide (PEI), polyetheretherketone, liquid crystal polymer (LCP), thermoplastic polyimide (TPI), polybenzimidazole (PBI), polymethylbenzene (TPX), poly 1,4-cyclohexanedimethylene terephthalate (PCT), polyamide 46 (PA46), polyamide 6T (PA6T), polyamide 9T (PA9T), polyamides 11 and 12 (PA11 and PA12), fluorine resin, and polyphthalamide.

While a super engineering plastic, such as PPS, PEEK, PA, PPA or PAI, is exemplified as the material of the cage 30, if necessary, the cage 30 may be made of any of these engineering plastics or a different engineering plastic with glass fiber or carbon fiber added thereto to increase the strength of the cage.

The outer ring 11 has, on its inner peripheral surface, an outer ring raceway surface 12 inclined relative to the center axis of the outer ring 11. The inner ring 20 has, on its outer peripheral surface, an inner ring raceway surface 22 inclined relative to the center axis of the inner ring 20. The inner ring 20 includes a radially outwardly protruding small flange 23 at a first axial side of the inner ring raceway surface 22. The inner ring 20 further includes a radially outwardly protruding large flange 24 at a second axial side of the inner ring raceway surface 22. The small flange 23 has a small-diameter-side inner end surface 23a facing, and configured to come into sliding contact with, the small-diameter end surfaces 42 of the tapered rollers 40. The large flange 24 has a large-diameter-side inner end surface 24a facing, and configured to come into sliding contact with, the large-diameter end surfaces 43 of the tapered rollers 40. While the bearing 10 is operating (rotating), the large-diameter end surfaces 43 of the tapered rollers 40 are brought into contact with, and guided by, the inner end surface 24a of the large flange annular portion 24 of the inner ring 20.

The cage 30 includes a large-diameter annular portion 31, a small-diameter annular portion 32, a plurality of pillars 33, and a plurality of pockets 34. The large-diameter annular portion 31 has an annular shape when seen in the axial direction, and axially overlaps with the large flange 24 of the inner ring 20. The small-diameter annular portion 32 has an annular shape when seen in the axial direction, and axially overlaps with the small flange 23 of the inner ring 20. The pillars 33 are disposed between the large-diameter annular portion 31 and the small-diameter annular portion 32 so as to be circumferentially equidistantly spaced apart from each other. The large-diameter annular portion 31 and the small-diameter annular portion 32 are coupled together through the pillars 33. The pockets 34 are defined by the pillars 33, the large-diameter annular portion 31, and the small-diameter annular portion 32.

Each pillar 33 has, in its entirety, a radial wall thickness predetermined such that, with the cage mounted in position, the radially outer side of the pillar 33 is located near the outer ring raceway surface 12, and the radially inner side of the pillar 30 is located near the inner ring raceway surface 22. The radial wall thicknesses of the pillars 33 are appropriately determined depending on where the bearing 10 is used. If the pillars 33 have widths (dimensions in the vertical direction of FIG. 2C) that are 40 to 50% (preferably 45%) of the diameters of the small-diameter ends of the tapered roller 40, the contact area of the cage 30 with the tapered rollers 40 will be small. As a result thereof, the shearing torque and the stirring torque of lubricating oil will be small, and thus the rotation torque of the bearing 10 will be small.

Each pillar 33 of the cage 30 has an oil groove 35 in its radially inner surface 33a (see FIGS. 2A to 2C). The oil groove 35 is an angular groove that extends from substantially the axially central portion of the pillar 33 toward the large-diameter annular portion 31, and bifurcates at its end portion. Specifically, the oil groove 35 comprises a straight (first) oil groove portion 35a, and a pair of bifurcated branch (second) oil groove portions 35b. The straight oil groove portion 35a extends from substantially the axially central portion of the pillar 33 toward the large-diameter annular portion 31. The pair of branch oil groove portions 35b branch off from one end of the straight groove portion 35a closer to the large-diameter annular portion 31. The branch oil groove portions 35b are inclined oil groove portions extending obliquely from the one end of the straight groove portion 53a in the opposite circumferential directions, respectively. The branch oil groove portions 35b are open to an axially inner surface 31a of the large-diameter annular portion 31 that partially defines the pockets 34. Therefore, while the bearing 10 is rotating, the centrifugal force causes lubricating oil in the oil grooves 35 to flow through the branch oil groove portions 35b and to be scattered toward the axially inner surface 31a of the large-diameter annular portion 31 (as shown by the arrows in FIGS. 2A and 2C). The lubricating oil is thus supplied into spaces between the tapered rollers 40 and the axially inner surface 31a of the large-diameter annular portion 31. The pair of branch oil groove portions 35b of each oil groove 35 are symmetrically arranged with respect to the axial direction of the pillar 33.

Each pillar 33 of the cage 30 has, in each of two circumferential side surfaces 33b of the pillar 33 that partially define the corresponding pockets 34, a plurality of slits 36 that radially inwardly guide the flow of lubricating oil. The slits 36 in each circumferential side surface 33b extend obliquely, and communicate with the oil groove 35 (with at least one of them communicating with the corresponding branch oil groove portion 35b). The number of the slits 36 in each circumferential side surface 33b of the pillar 33 is two in the shown example, but is not limited to two.

Specifically, in the example shown, the slits 36 in each circumferential side surface 33b consist of a first slit 36a communicating with the straight oil groove portion 35a, and a second slit 36b communicating with the corresponding branch oil groove portion 35b. The first slit 36a extends to the straight oil groove portion 35a from a portion of the circumferential side surface 33b of the pillar 33 which is located close to the small-diameter annular portion 32, and somewhat away from the radially outer surface 33c of the pillar 33. In other words, the first slit 36a does not communicate with (is not open to) the radially outer surface 33c.

The second slit 36b extends across the circumferential side surface 33b of the pillar 33 so as to communicate with both the corresponding branch oil groove portion 35b and the radially outer surface 33c of the pillar 33. The first and second slits 36a and 36b function to retain lubricating oil therein while the bearing is not rotating, and function to supply the retained lubricating oil to the oil groove 35 while the bearing is operating (rotating). The first and second slits 36a and 36b have widths (i.e., dimensions orthogonal, in FIG. 2A, to the direction in which the slit extends) that are 25% or more and 50% or less of the width of the pillar 33. If the widths of the first and second slit 36a and 36b are more than 50% of the width of the pillar 33, this will weaken the lubricating oil retaining ability of the slits, whereas, if the widths thereof are less than 25% of the width of the pillar 33, this will reduce the amount of lubricating oil supplied from the slits to the end surface 24a of the large flange 24 of the inner ring 20 while the bearing is rotating.

Oil retaining grooves 37 for retaining lubricating oil are formed in the axially inner surface 31a of the large-diameter annular portion 31. In particular, the oil retaining grooves 37 are formed in the portions of the axially inner surface 31a between the respective circumferentially adjacent pairs of pillars 33 so as to communicate with the respective circumferential side surfaces 33b of the pillars 33. By providing the oil retaining grooves 37, if a sufficient amount of lubricating oil scattered from the oil grooves 35 does not reach (is not guided to) the end surface 24a of the large flange 24 of the inner ring 20, lubricating oil retained in the oil retaining grooves 37 can be additionally supplied to the end surface 24a. Therefore, by forming the oil retaining grooves 37, it is possible to further improve (increase) the lubricating oil retaining ability of the bearing while not rotating, and the lubricating oil supplying ability of the bearing while rotating.

To provide stable support of the cage 30, the inner diameter of the cage 30 on its small diameter side is reduced to reduce the gap t between that portion of the cage 30 and the small flange 23 of the inner ring 20 opposed to each other. Another benefit of the reduced gap t is that it reduces the amount of lubricating oil entering the interior of the bearing, thereby reducing stirring toque in the interior of the bearing. While the reduced gap t reduces the amount of lubricating oil entering the interior of the bearing, since a sufficient amount of lubricating oil can be captured in, and supplied from, the oil grooves 35, the slits 36 and the oil retaining grooves 37, the bearing is still sufficiently resistant to seizure.

Figure 3:
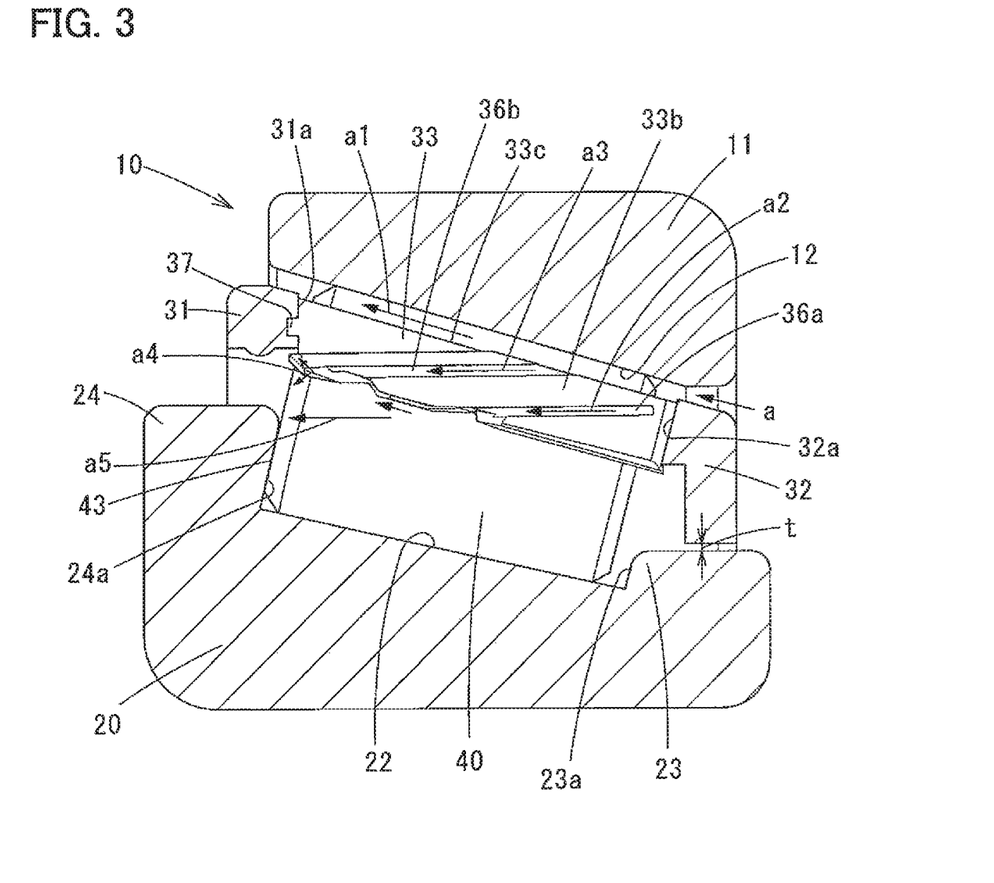
FIG. 3 is a partial vertical sectional view of the first embodiment, illustrating its operational state.

The gap t, i.e., the gap between the radially outer surface of the small flange 23 of the inner ring 20 and the radially inner surface of the small-diameter annular portion 32 of the cage 80, is set within the range of 1.5% or less of the outer diameter dimension L of the small flange 23 (see FIGS. 1 and 3). However, if there is no gap t, this means that the cage 30 comes into contact with the small flange 23, thereby generating drag torque. Therefore, the above range does not include 0%.

The tapered roller bearing 10 of the above-described embodiment is used generally in an automobile, and specifically in a power transmission device of an automobile, such as a differential or a transmission, which will be described later. When the power transmission device such as the differential or the transmission is actuated, lubricating oil in the interior of the device is stirred and scattered toward the tapered roller bearing 10. In this embodiment, the inner ring 20 and the tapered rollers 40 of the tapered roller bearing 10 rotate.

It is now described with reference to FIG. 3 how lubricating oil flows in the interior of the tapered roller bearing 10 while operating. As indicated by the arrows in FIG. 3, lubricating oil a scattered onto the tapered roller bearing 10 enters an oil flow path defined between the inner peripheral surface (raceway surface 12) of the outer ring 11 and the radially outer surface 33c of the cage 30, and flows into the bearing from the sides of the tapered rollers 40 closer to the small-diameter annular portion 32. In particular, the lubricating oil a that has entered the bearing flows through the space radially outward of the cage 30 while flowing along the raceway surface 12 of the outer ring 11 (see the arrow a1). The lubricating oil a in the bearing partially flows along the radially outer surface 33c of the cage 30, and then is guided to the circumferential side surfaces 33b of the pillars 33, where the lubricating oil flows through the first slits 36a and is guided into (the straight oil groove portions 35a of) the oil grooves 35 (see the arrow a2). The lubricating oil a guided into each straight groove portion 35a is split into two separate flows by the pairs of branch oil groove portions 35b and scattered (see the arrows a4). Also, the lubricating oil a flowing along the raceway surface 12 of the outer ring 11 partially flows along the radially outer surface 33c of the cage 30, into the second slits 36b, and then is guided into the branch oil groove portions 35b (see the arrow a3). The lubricating oil a supplied into (the straight oil groove portions 35a and the branch oil groove portions 35b of) the oil grooves 35 from the first and second slits 36a and 36b flows into spaces between the large-diameter end surfaces 43 of the tapered rollers 40 and the large flange 24 of the inner ring 20 (see the arrows a4). The lubricating oil a guided into the branch oil groove portions 35b is scattered toward the oil retaining grooves 37 as well. Also, in this embodiment, the lubricating oil a guided into the first slits 36a is partially scattered from the first slits 36a directly toward the large-diameter end surfaces 43 of the tapered rollers 40 (see the arrow a5). However, the slits may be arranged such that the lubricating oil a guided into the second slits 36b is partially scattered from the second slits 36b directly toward the large-diameter end surfaces 43 of the tapered rollers 40.

In this way, in the tapered roller bearing 10, lubricating oil a can be easily supplied into spaces between the large-diameter end surfaces 43 of the tapered rollers 40 and the large flange 24 of the inner ring 20.

When the tapered roller bearing 10 stops, the lubricating oil a in the interior of the tapered roller bearing 10 is retained in the oil grooves 35, the slits 36, and the oil retaining grooves 37. That is, the oil grooves 35, the slits 36, and the oil retaining grooves 37 all have the function of retaining lubricating oil. Therefore, when the power transmission device is actuated, at which time the viscosity of lubricating oil is typically high, the lubricating oil retained in the oil grooves 35, the slits 36, and the oil retaining grooves 37 can be easily supplied into spaces between the large-diameter end surfaces 43 of the tapered rollers 40 and the large flange 24 of the inner ring 20 in a short time. This further improves the resistance to seizure between the large-diameter end surfaces 43 and the large flange 24.

In the above-described manner, the lubricating oil guided (as shown by the arrows a2 and a3) into the slits 36 of each pillar 33, which extend obliquely toward the radially inner side of the pillar 33, is guided toward the large-diameter annular portion 31, and flows into (the straight oil groove portion 35a and the branch oil groove portions 35b of) the oil groove 35. Thereafter, due to the centrifugal force, the lubricating oil guided into the branch oil groove portions 35b from the straight oil groove portion 35a and from the second slits 36b is scattered onto the axially inner surface 31a of the large-diameter annular portion 31 from the branch oil groove portions 35b, thereby ensuring smooth lubrication between the axially inner surface 31a of the large-diameter annular portion 31 and the large-diameter end surfaces 43 of the tapered rollers 40. Thus, it is possible to easily supply lubricating oil a to areas where metal-to-metal contact tends to occur, and thus to improve (ensure) the seizure resistance of the tapered roller bearing 10.

Also, lubricating oil a stirred during operation of e.g., the automotive power transmission device, and lubricating oil a scattered from (the branch oil groove portions 35b of) the oil grooves 35 is retained in the oil retaining grooves 37. Since the oil grooves 35 include, in addition to the straight oil groove portion 35a, the branch oil groove portions 35b, a larger amount of lubricating oil is retained in the oil retaining grooves 37 when the bearing stops. The lubricating oil a retained in the oil retaining grooves 37 is supplied, for lubrication, into spaces between the axially inner surfaces 31a of the large-diameter annular portion 31 and the large-diameter end surfaces 43 of the tapered rollers 40.

Figure 4:
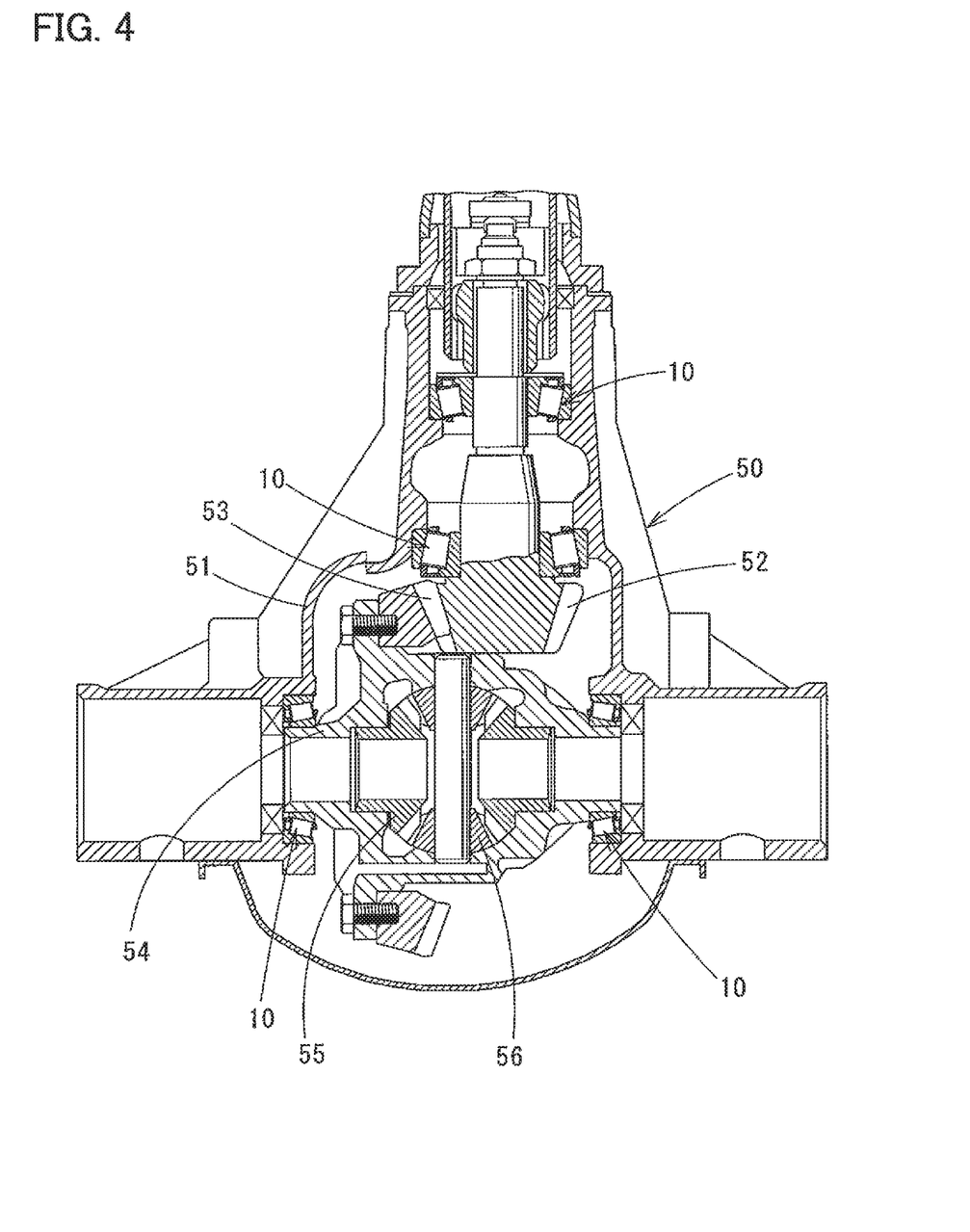
FIG. 4 is a sectional view of an automotive differential in which tapered roller bearings according to the present invention are mounted.
Figure 5:
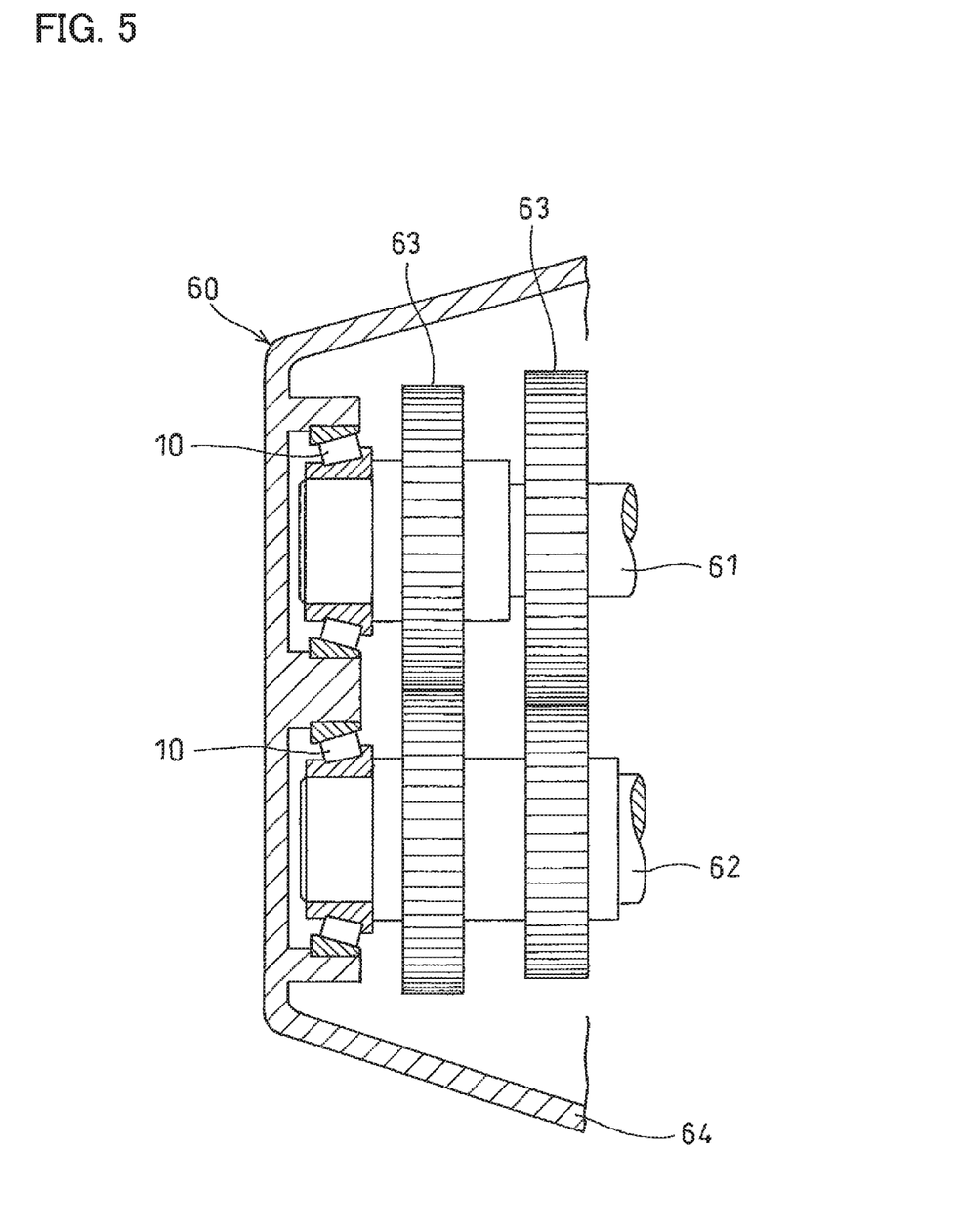
FIG. 5 is a sectional view of an automotive transmission in which tapered roller bearings according to the present invention are mounted.

The tapered roller bearing 10 according to the first embodiment is suitably used, e.g., to support a shaft of a power transmission device of an automobile such as a differential or a transmission. This is because tapered roller bearings supporting these shafts need to be broken in at a low rotation speed with a preload applied thereto. FIGS. 4 and 5 exemplify tapered roller bearings 10 corresponding to the first embodiment, as mounted in the power transmission path of an automobile.

More specifically, FIG. 4 exemplifies a differential 50 constituting the power transmission path of an automobile. The differential 50 includes a drive pinion 52 supported by two tapered roller bearings 10 so as to be rotatable relative to a housing 51, and a ring gear 53 in mesh with the drive pinion 52. The ring gear 53 is mounted to a differential gear case 54 which is supported by a pair of tapered roller bearings 10 so as to be rotatable relative to the housing 51. The differential 50 further includes, in the differential gear case 54, pinions 56, and a pair of side gears 55 in mesh with the pinions 55. The drive pinion 52, the ring gear 53, the differential gear case 54, the pinions 56, and the side gears 55 are received in the housing 51, in which gear oil is sealed. The gear oil is used to lubricate the tapered roller bearings 10, too. The shown tapered roller bearings 10 correspond to the tapered roller baring 10 of the first embodiment, and have the basic features of the present invention, though their designs are appropriately altered depending on where they are mounted.

FIG. 5 exemplifies a transmission constituting the power transmission path of an automobile in which tapered roller bearings 10 corresponding to the first embodiment are mounted.

The transmission 60 of FIG. 5 is a multistage transmission that changes the gear ratio in a stepwise manner, and includes tapered rolling bearings 10 corresponding to the first embodiment to rotatably support rotary shafts (such as an input shaft 61 and an output shaft 62) of the transmission. The tapered roller bearings 10 used in the transmission has the basic features of the present invention, though their designs are appropriately altered depending on where they are mounted.

The transmission 60 includes an input shaft 61 to which the rotation of the engine is transmitted; an output shaft 62 extending parallel to the input shaft 61; a plurality of gear trains 63 that transmit the rotation of the input shaft 61 to the output shaft 62; and clutches (not shown) mounted between the input shaft 61 and the respective gear trains 63, or between the output shaft 62 and the respective gear trains 63. By selectively engaging any one of the clutches, the rotation of the input shaft 61 is transmitted through the selected one of the gear trains 63 to the output shaft 62 in the selected gear ratio.

The rotation of the output shaft 62 is transmitted to an output gear (not shown), and the rotation of the output gear is transmitted to e.g., a differential. The input and output shafts 61 and 62 are rotatably supported by the corresponding tapered roller bearings 10, respectively. The transmission 60 is configured such that lubricating oil splashed due to the rotation of the gears, or lubricating oil pressure-fed by an oil pump driven by the engine and injected through nozzles (not shown) located within a housing 65 of the transmission is supplied to the tapered roller bearings 10. In another arrangement, the tapered roller bearings 10 may be lubricated by partially immersing them in lubricating oil retained within the housing 64.

As described above, the cage 30 of the tapered roller bearing 10 according to the first embodiment has oil grooves 35, slits 36 and oil retaining grooves 37 that all function to catch and retain lubricating oil. By using this tapered roller bearing 10 in a power transmission device of an automobile such as a differential or a transmission, even when the automobile is started suddenly, i.e., even while not a sufficient amount of lubricating oil is being supplied to the tapered roller bearing 10, lubricating oil retained in the oil grooves 35, the slits 36 and the oil retaining grooves 37 is supplied into spaces between the large-diameter end surfaces 43 of the tapered rollers 40 and the large flange 24 of the inner ring 20. This ensures the seizure resistance of the tapered roller bearing 10. Also, even if lubricating oil having a low viscosity, or a small amount of lubricating oil is used in the interior of the automotive power transmission device, lubricating oil in the oil grooves 35, the slits 36 and the oil retaining grooves 37 is supplied into spaces between the large-diameter end surfaces 43 of the tapered rollers 40 and the large flange 24 of the inner ring 20. For example, lubricating oil having a low viscosity, and used in a power transmission device of an automobile such as a differential or a transmission means lubricating oil having a kinematic viscosity of 2 to 8 centistokes (cSt) at 100 degrees Celsius. "Centistoke (cSt)" is the unit of kinematic viscosity in the CGS unit system, and 1 centistoke (cSt) corresponds to 1 square millimeter per second ($mm^2/S$) in the SI unit system.

Second Embodiment

A tapered roller bearing according to the second embodiment of the present invention includes a cage partially different in shape from the cage of the tapered roller bearing according to the first embodiment. Only the features of the cage according to the second embodiment different from the features of the cage according to the first embodiment are described below.

Figure 6A:
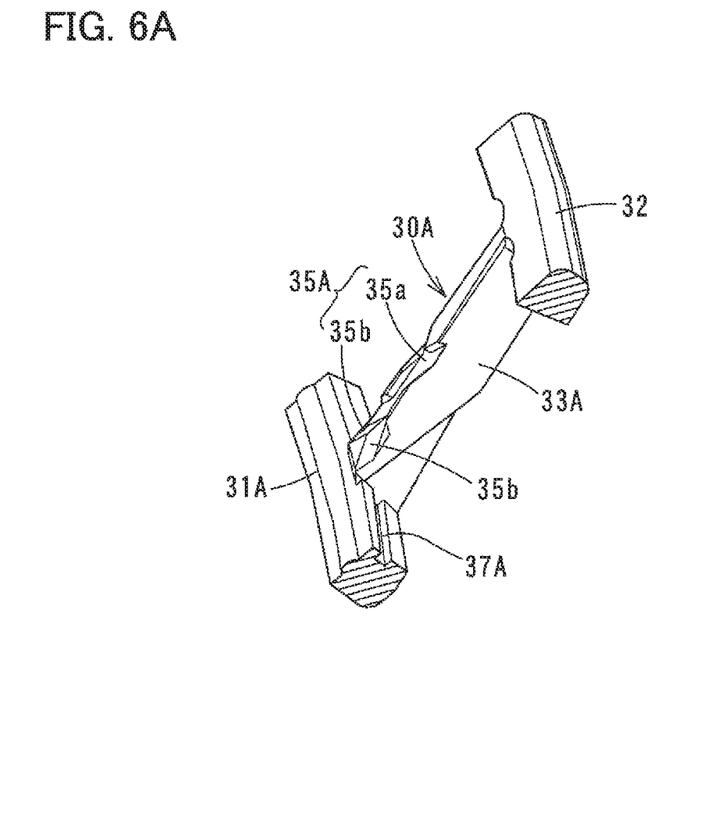
FIGS. 6A and 6B are, respectively, a fragmentary perspective view and a fragmentary plan view of a cage of a tapered roller bearing according to a second embodiment of the present invention.
Figure 6B:
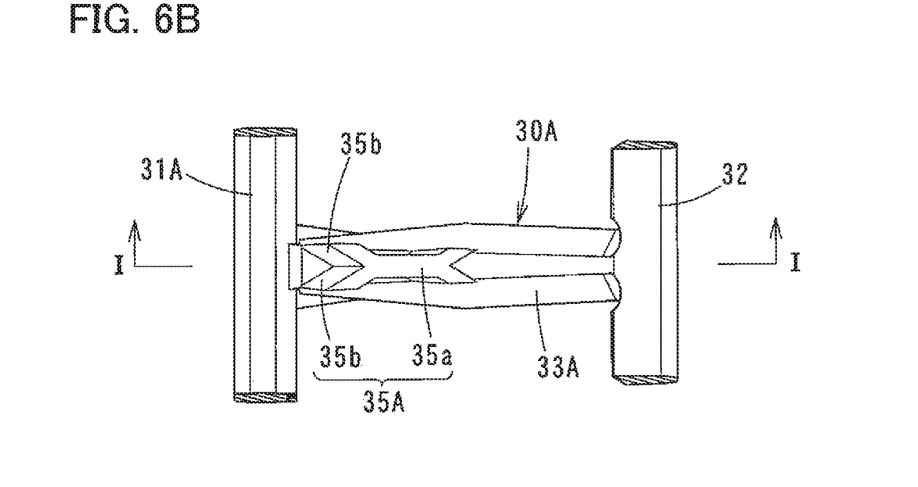
Figure 6C:
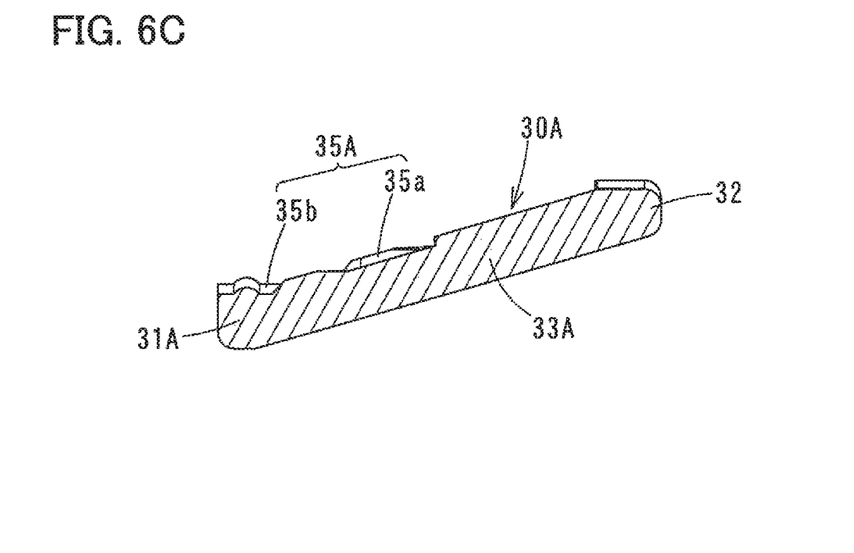
FIG. 6C is a sectional view taken along line I-I of FIG. 6B.

FIGS. 6A to 6C illustrate the cage 30A of the tapered roller bearing according to the second embodiment, and correspond to FIGS. 2A to 2C. As illustrated in FIGS. 6A to 6C, the cage 30A does not include the slits 36 of the cage 30 of the first embodiment. In other words, the slits 36 are not essential elements in the present invention. In the second embodiment, lubricating oil is captured by the oil grooves 35A. Also, as illustrated in FIG. 6A, the circumferentially rear (in the rotational direction of the bearing 10) one of each circumferentially adjacent pair of the oil retaining grooves, indicated at 37A, is omitted.

Third Embodiment

A tapered roller bearing according to the third embodiment of the present invention includes a cage 30B partially different in shape from the cage of the tapered roller bearing according to the first embodiment. Only the features of the cage 30B according to the third embodiment different from the features of the cage according to the first embodiment are described below.

Figure 7:
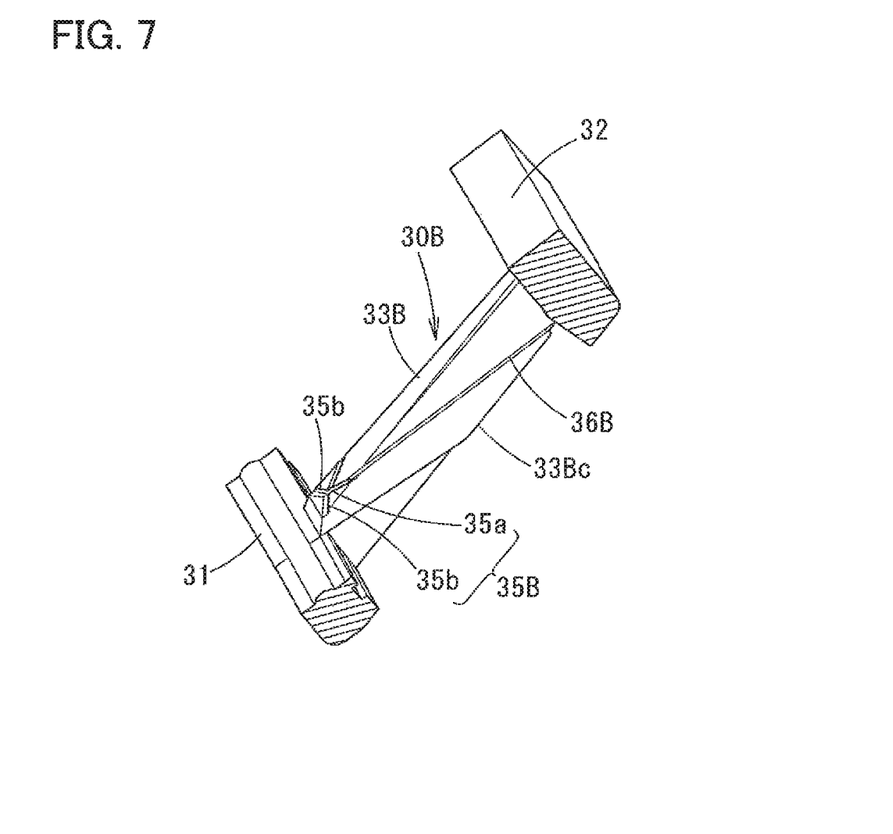
FIG. 7 is a fragmentary perspective view of a cage of a tapered roller bearing according to a third embodiment of the present invention.

FIG. 7 is a fragmentary perspective view of the cage 30B of the tapered roller bearing according to the third embodiment. As illustrated in FIG. 7, the cage 30B differs from the cage 30 of the first embodiment in that the cage 30B has, on each circumferential side surface of each pillar 33B, a single slit 36B extending radially obliquely to communicate with, or open to, (the straight groove portion 35Ba of) the oil groove 35B, and the end portion of the radially outer surface 33Bc of the pillar 33B closer to the small-diameter annular portion 32. Therefore, compared with the cage 30 of the first embodiment, lubricating oil flowing onto the radially outer surfaces 33Bc of the pillars 33B can be more easily guided into the slits 36B. This increases the amount of lubricating oil flowing into the oil grooves 35B, thereby further improving the seizure resistance of the tapered roller bearing 10.

Fourth Embodiment

A tapered roller bearing according to the fourth embodiment of the present invention includes a cage partially different in shape from the cage of the tapered roller bearing according to the first embodiment. Only the features of the cage according to the fourth embodiment different from the features of the cage according to the first embodiment are described below.

Figure 8:
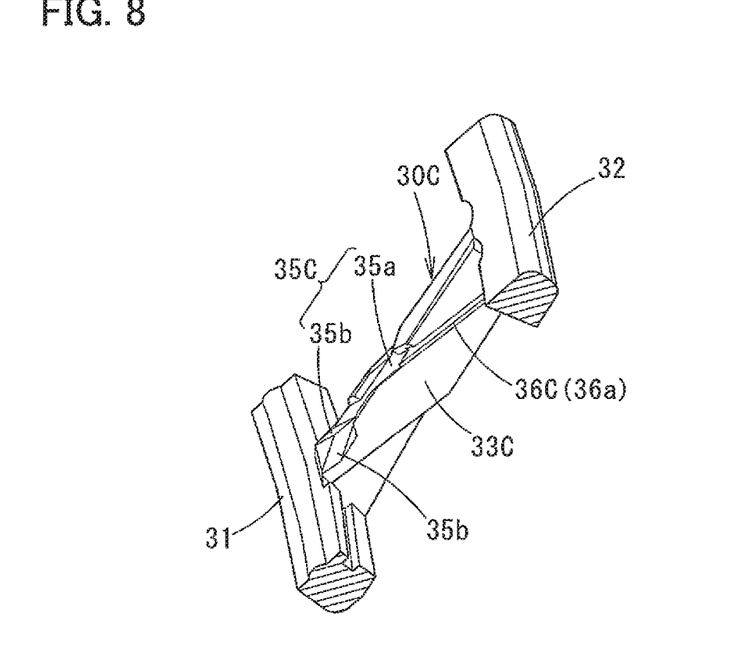
FIG. 8 is a fragmentary perspective view of a cage of a tapered roller bearing according to a fourth embodiment of the present invention.

FIG. 8 is a fragmentary perspective view of the cage 30C of the tapered roller bearing according to the fourth embodiment. As illustrated in FIG. 8, the cage 30C differs from the cage 30 of the first embodiment in that the slits 36C consists only of the first slits 36a, i.e., the slits communicating with the straight groove portions 35a, and include no second slits 36b. In other words, the second slits 36b are not essential elements in the present invention.

Fifth Embodiment

A tapered roller bearing according to the fifth embodiment of the present invention includes a cage partially different in shape from the cage of the tapered roller bearing according to the first embodiment. Only the features of the cage according to the fifth embodiment different from the features of the cage according to the first embodiment are described below.

Figure 9:
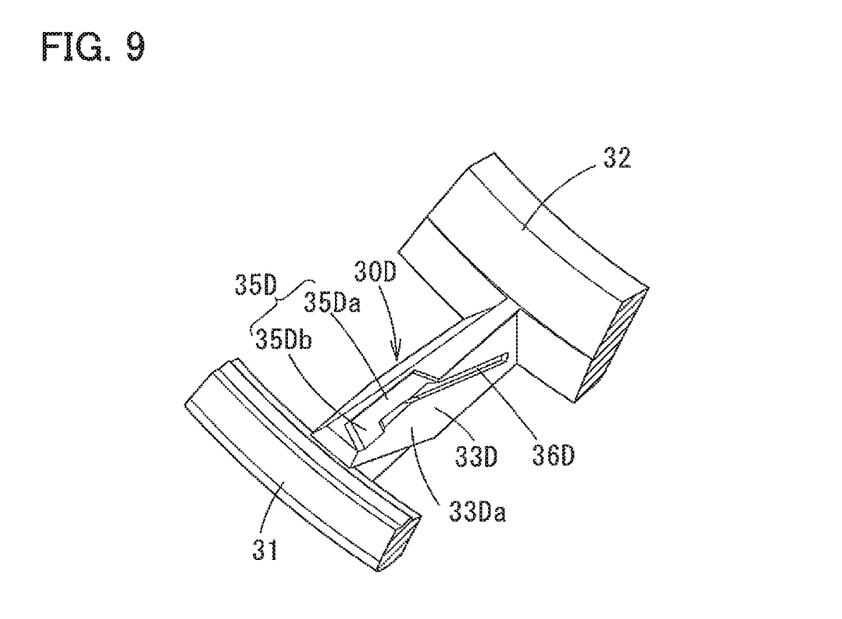
FIG. 9 is a fragmentary perspective view of a cage of a tapered roller bearing according to a fifth embodiment of the present invention.

FIG. 9 is a fragmentary perspective view of the cage 30D of the tapered roller bearing according to the fifth embodiment. As illustrated in FIG. 9, the cage 30D differs from the cage 30 of the first embodiment in that the oil groove 35D of each pillar 33D is formed by recessing the circumferential side surface 33Da of each pillar 33D in one of the two opposite circumferential directions. The oil groove 35D comprises a straight oil groove portion 35Da, and an inclined oil groove portion 35Db extending obliquely from the end of the straight oil groove portion 35Da closer to the large-diameter annular portion 31 in the other of the two opposite circumferential directions (toward the circumferential side surface 33Da of the pillar 33D).

Needless to say, any of the tapered roller bearings 30A to 30D according to the second to fifth embodiments can also be suitably used e.g., to support a shaft of a power transmission device of an automobile such as a differential or a transmission.

The above-described embodiments and specific examples are mere examples in every respect, and the present invention is not limited thereto. Therefore, the scope of the present invention is indicated by the claims, and should be understood to include all modifications within the scope and the meaning equivalent to the scope of the claims.

DESCRIPTION OF REFERENCE NUMERALS

10: tapered roller bearing
11: outer ring
20: inner ring
22: inner ring raceway surface of the inner ring
23: small flange
24: large flange
30, 30A, 30B, 30C, 30D: cage
31, 31A: large-diameter annular portion
31a: axially inner surface of the large-diameter annular portion
32: small-diameter annular portion
33: pillar
33a: radially inner surface
33b: circumferential side surface
33c: radially outer surface
35, 35A, 35B, 35OC, 35D: oil groove
35a: straight oil groove portion
35b: branch oil groove portion
36, 36B, 36C, 36D: slit
37: oil retaining groove
a, a1, a2, a3, a4: lubricating oil
t: gap between the small flange of the inner ring and the small-diameter annular portion of the cage
L: outer diameter dimension of the small flange of the inner ring

The invention claimed is:
1. A tapered roller bearing comprising:
an outer ring;
an inner ring disposed radially inwardly of the outer ring;
a cage between the outer ring and the inner ring; and
a plurality of tapered rollers retained by the cage,
wherein the inner ring includes:
  a raceway surface on which the tapered rollers are rollable;
  a small flange on a small-diameter side of the raceway surface; and
  a large flange on a large-diameter side of the raceway surface,
wherein the cage includes:
  a large-diameter annular portion;
  a small-diameter annular portion;
  pillars extending axially to couple together the large-diameter annular portion and the small-diameter annular portion; and
  pockets in each of which a respective one of the tapered rollers is disposed,
wherein a space is defined between the outer ring and the inner ring, the space forming an oil flow path through which lubricating oil is to flow from a side of the small flange to a side of the large flange, and wherein a radially inner surface of each of the pillars has an oil groove through which the lubricating oil is to flow, the oil groove comprising:
- a first oil groove portion extending along the pillar in an axial direction; and
- a second oil groove portion extending obliquely relative to the axial direction from a large-diameter-side end of the first oil groove portion toward the large-diameter annular portion in one of two opposite circumferential directions.

2. The tapered roller bearing according to claim 1, wherein the oil flow path is defined between an inner peripheral surface of the outer ring and a radially outer surface of the cage, and
wherein the cage further includes, in each of the pillars, slits that guide a flow of the lubricating oil radially inwardly, the slits communicating with the oil groove.

3. The tapered roller bearing according to claim 2, wherein the slits of each of the pillars communicate with a radially outer surface of the pillar, and the oil groove.

4. The tapered roller bearing according to claim 3, wherein the second oil groove portion of the oil groove of each of the pillars is one of a pair of second oil groove portions, each of the pair of second oil groove portions being open to a respective one of two circumferential side surfaces of the pillar.

5. The tapered roller bearing according to claim 3, wherein the large-diameter annular portion has oil retaining grooves in a side surface of the large-diameter annular portion facing the pockets.

6. The tapered roller bearing according to claim 3, wherein a gap is defined between a radially outer surface of the small flange of the inner ring and a radially inner surface of the small-diameter annular portion of the cage, the gap being 1.5% or less of an outer diameter dimension of the small flange.

7. The tapered roller bearing according to claim 3, wherein the tapered roller bearing is configured to be mounted in a power transmission device of an automobile.

8. The tapered roller bearing according to claim 2, wherein the second oil groove portion of the oil groove of each of the pillars is one of a pair of second oil groove portions, each of the pair of second oil groove portions being open to a respective one of two circumferential side surfaces of the pillar.

9. The tapered roller bearing according to claim 2, wherein the large-diameter annular portion has oil retaining grooves in a side surface of the large-diameter annular portion facing the pockets.

10. The tapered roller bearing according to claim 2, wherein a gap is defined between a radially outer surface of the small flange of the inner ring and a radially inner surface of the small-diameter annular portion of the cage, the gap being 1.5% or less of an outer diameter dimension of the small flange.

11. The tapered roller bearing according to claim 2, wherein the tapered roller bearing is configured to be mounted in a power transmission device of an automobile.

12. The tapered roller bearing according to claim 1, wherein the second oil groove portion of the oil groove of each of the pillars is one of a pair of second oil groove portions, each of the pair of second oil groove portions being open to a respective one of two circumferential side surfaces of the pillar.

13. The tapered roller bearing according to claim 12, wherein the large-diameter annular portion has oil retaining grooves in a side surface of the large-diameter annular portion facing the pockets.

14. The tapered roller bearing according to claim 12, wherein a gap is defined between a radially outer surface of the small flange of the inner ring and a radially inner surface of the small-diameter annular portion of the cage, the gap being 1.5% or less of an outer diameter dimension of the small flange.

15. The tapered roller bearing according to claim 12, wherein the tapered roller bearing is configured to be mounted in a power transmission device of an automobile.

16. The tapered roller bearing according to claim 1, wherein the large-diameter annular portion has oil retaining grooves in a side surface of the large-diameter annular portion facing the pockets.

17. The tapered roller bearing according to claim 16, wherein a gap is defined between a radially outer surface of the small flange of the inner ring and a radially inner surface of the small-diameter annular portion of the cage, the gap being 1.5% or less of an outer diameter dimension of the small flange.

18. The tapered roller bearing according to claim 16, wherein the tapered roller bearing is configured to be mounted in a power transmission device of an automobile.

19. The tapered roller bearing according to claim 1, wherein a gap is defined between a radially outer surface of the small flange of the inner ring and a radially inner surface of the small-diameter annular portion of the cage, the gap being 1.5% or less of an outer diameter dimension of the small flange.

20. The tapered roller bearing according to claim 1, wherein the tapered roller bearing is configured to be mounted in a power transmission device of an automobile.

21. The tapered roller bearing according to claim 1, wherein the second oil groove portion is inclined in a radially outward direction relative to the first oil groove portion.

* * * * *